(12) United States Patent
Oskarsson

(10) Patent No.: US 11,528,894 B2
(45) Date of Patent: Dec. 20, 2022

(54) DEPURATION SYSTEM

(71) Applicant: SAEPLAST ICELAND EHF, Dalvik (IS)

(72) Inventor: Dagur Oskarsson, Dalvikurbyggd (IS)

(73) Assignee: SAEPLAST ICELAND EHF

( * ) Notice: Subject to any disclaimer, the term of this patent is extended or adjusted under 35 U.S.C. 154(b) by 0 days.

(21) Appl. No.: 16/617,800

(22) PCT Filed: May 31, 2018

(86) PCT No.: PCT/IS2018/050005
§ 371 (c)(1),
(2) Date: Nov. 27, 2019

(87) PCT Pub. No.: WO2018/220658
PCT Pub. Date: Dec. 6, 2018

(65) Prior Publication Data
US 2020/0187465 A1 Jun. 18, 2020

(30) Foreign Application Priority Data
Jun. 1, 2017 (IS) .......................................... 050180

(51) Int. Cl.
*A01K 61/54* (2017.01)
*A01K 63/02* (2006.01)
(Continued)

(52) U.S. Cl.
CPC ............. *A01K 63/02* (2013.01); *A01K 61/54* (2017.01); *A22C 29/043* (2013.01); *B65D 21/0213* (2013.01); *A01K 63/04* (2013.01)

(58) Field of Classification Search
CPC ................................ A01K 61/54; A01K 63/04
(Continued)

(56) References Cited

U.S. PATENT DOCUMENTS 3,641,982 A * 2/1972 Woodridge .......... A22C 29/043
119/243
4,386,700 A * 6/1983 Deaton ................ B65D 81/261
220/571

(Continued)

FOREIGN PATENT DOCUMENTS

EP  0285457 A1  10/1988
EP  2567620 A1   3/2013
(Continued)

OTHER PUBLICATIONS

International Search Report and Written Opinion issued in PCT/IS2018/050005 dated Aug. 30, 2018.
(Continued)

*Primary Examiner* — David J Parsley
(74) *Attorney, Agent, or Firm* — Heslin Rothenberg Farley & Mesiti, P.C.

(57) ABSTRACT

The invention relates to a container assembly comprising a container for depuration of mollusks and a drain canal unit. The assembly provides a closed circulation of water via a circulation route that has an entry portion between the floor of the container and the drain canal unit, a circulation channel between the corner of the container and a drain canal unit, and a drain canal within the drain canal unit. Also provided is a drain canal unit for use in stackable containers that provides circulation of water within a container assembly.

18 Claims, 9 Drawing Sheets

(51) Int. Cl.
*B65D 21/02* (2006.01)
*A22C 29/04* (2006.01)
*A01K 63/04* (2006.01)

(58) Field of Classification Search
USPC .................................................. 119/234, 243
See application file for complete search history.

(56) References Cited

U.S. PATENT DOCUMENTS

| | | | | |
|---|---|---|---|---|
| 4,537,149 | A * | 8/1985 | Ryan ..................... | A01K 61/54 |
| | | | | 119/243 |
| 5,186,121 | A * | 2/1993 | Smith, Jr. .............. | A01K 63/04 |
| | | | | 119/243 |
| 5,249,548 | A * | 10/1993 | Dupuy ................... | A01K 63/00 |
| | | | | 119/243 |
| 11,273,955 | B2 * | 3/2022 | Sostmann .......... | B65D 21/0209 |
| 2017/0251643 | A1 | 9/2017 | Boudreau | |

FOREIGN PATENT DOCUMENTS

| | | |
|---|---|---|
| ES | 2187326 A1 | 6/2003 |
| FR | 2681048 A1 | 3/1993 |
| WO | 2016003264 A1 | 7/2016 |

OTHER PUBLICATIONS

Iceland Search Report issued in Iceland application No. 050180 dated Sep. 5, 2017.

\* cited by examiner

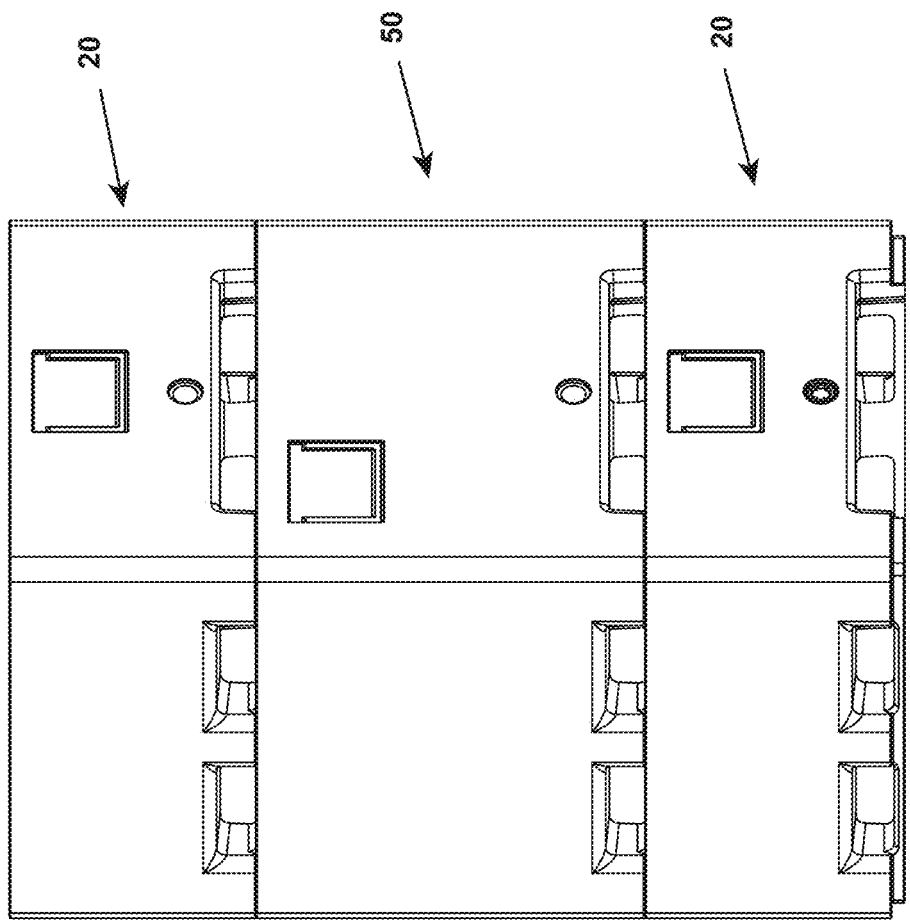

DEPURATION SYSTEM

CROSS REFERENCE TO RELATED APPLICATIONS

This application is a U.S. National Phase filing under 35 U.S.C. § 371 of International Application PCT/IS2018/050005, filed May 31, 2018, and published as WO 2018/220658 A1 on Dec. 6, 2018. PCT/IS2018/050005 claims priority from Iceland application number 050180, filed Jun. 1, 2017. The entire contents of each of these prior applications are hereby incorporated herein by reference.

FIELD

The present invention relates to a container system for the depuration of mollusk. In particular, the invention provides a system for depuration by means of a water circulation mechanism in a container.

Introduction

Depuration is a process of purging biological contaminants, such as bacteria, and impurities such as sand and silt, from marine and freshwater animals. Depuration is particularly used for filter feeders such as oysters, mussels and clams.

The process usually involves the rinsing of the marine animals held in tanks with clean water, where the animals are allowed to filter feed to force out undesired contaminants. Usually a constant flow of water is maintained, to allow for the removal of contaminants and fecal material, but at relatively low flow rates so that solid contaminants can settle at the bottom of the tank.

Many depuration tanks and vessels are known in the art. The present applicants (Sæplast, also known as Sæplast) have developed an insulated container (Sælast 705 container) that is insulated and stackable, and useful in the depuration of mollusks. The tank has recirculation channels molded into two of its corners, such that when the container is filled with water, there is forced recirculation of water through the recirculation channels. Recirculated water is subsequently released from the container through an opening in its floor, so that when placed in a stack of containers, water is released into an adjacent container in a stack.

EP 2567720 discloses a depuration container that has two recirculation lines molded into its corners, so that water can be forced through the two lines. The container has a release opening having an elliptical shape in its base, to discharge water from the container in an oblique fashion so as to promote turbulent flow of water from the container.

Since depuration is a process of removing sand, grit and biological contaminants such as bacteria, it is extremely important that the containers used for the depuration can be cleaned and disinfected. The closed circulation systems known in the art suffer from the disadvantage that the recirculation channels are typically molded into the structure of the container. The recirculation portion of the container can thus not be cleaned separately and/or replaced, should it become clogged or otherwise permanently polluted.

SUMMARY

The present invention addresses the above described deficiencies, by providing a container system that is suitable for the depuration of mollusks. The system comprises a container that is stackable and useful for depuration of mollusks, and at least one drain canal unit, that is designed to be interconnectable with corner parts of the container, so as to provide a closed circulation route within the container when engaged. Thereby, a two-part container system is provided, where each part can be separately produced. The system can be used in combination with the prior art system of the present applicants, i.e. the Sæplast 705 depuration container. More importantly, the system allows for improved cleaning of the circulation channels of the container system, including the possibility of separately cleaning and/or replacing the drain canal unit.

Accordingly, the invention provides a container assembly comprising (a) at least one drain canal unit adapted to be operatively engaged in an interlocked fashion with a container near a corner thereof, the drain canal unit comprising at least one drain canal that has at least one entry opening and at least one spout at its lower end, for insertion into and through the floor of a container so that the at least one entry opening, when the drain canal unit is interlocked with the container, faces a corner of the container; and (b) a container having four upright side walls and adapted to receive at least one drain canal unit so that the drain canal unit is engaged in an interlocked fashion with two adjacent side walls of the container in proximity to a corner thereof and wherein container is further adapted to receive the drain canal unit spout into and through an opening in the container floor so that a substantially water-tight seal is formed therebetween. When a drain canal unit is engaged with a corner of the container, at least one circulation channel between the drain canal unit and the corner of the container is formed, whereby the engaged at least one drain canal unit and the container form at least one circulation route, wherein each circulation route has an entry portion, between the drain canal unit and the floor of the container, a corner channel portion comprising at least one circulation channel, between the drain canal unit and a container corner, and a drain channel portion, within the drain canal unit. As a result, water within the body of the container can circulate through the entry portion into the corner circulation channel portion and be drained through the drain canal unit to exit the container assembly via its spout.

The invention also provides a drain canal unit that can be used in a container assembly for depuration of mollusks. Thus, also provided is a drain canal unit, for use in stackable containers to allow circulation of water within individual containers in a stack of containers and drainage into adjacent containers in a stack, the drain canal unit comprising an elongated body that has at least one spout extending from its lower end and that is adapted to fit into and through an opening in a container floor to provide a water-proof seal therebetween;

wherein the elongated body comprises a first surface that, when the drain canal unit is engaged with a container, faces the body of the container, a second surface that, when the drain canal unit is engaged with a container, faces a corner of the container, and wherein the first and second surfaces are interconnected by side surfaces that are adapted to fit into slots on respective side walls of the containers to provide an interlocked connection therebetween;

wherein the elongated body is at least partially hollow to provide a drain canal that is fluidly connected to the spout and that has at least one entry opening on the second surface of the drain canal body.

The drain canal unit thus serves two roles. One is to provide a barrier between the main cavity of the container and the corner portion of the container, so that water can not enter into the corner portion (the circulation channel), between the drain canal unit and the corner of the container, except by flowing through the gap between the drain canal unit and the container floor. The second role is to provide a drain canal, into which water can flow, through an entry opening at or near the upper end of the drain canal body, and be drained through the container floor, via the spout arranged on the lower end of the drain canal body.

The first surface, when the drain canal unit is engaged with a container, thus faces the main cavity of the container, while the second surface faces a corner of the container and is interconnected with side walls that meet at that corner.

A distinct advantage of providing a depuration system as a two-part assembly (i.e. an assembly of one or more drain canal unit and one container), is that each part can be manufactured independently. Thereby, complex molding of a container that includes drain canals to provide circulation and drainage of water in the container is avoided. Instead, the container itself has a much simpler structure, with no closed internal channels that can be difficult to mold and also can be difficult to clean or disinfect.

The drain canal unit is thus preferably manufactured separately from the container. If one or more drain canal unit becomes very contaminated or clogged, the unit can be replaced at minimal cost, since its production is much cheaper than that of the container. Further, the drain canal unit is easier to handle, and can be cleaned and/or disinfected using industrial cleaning and disinfecting systems in a rather simple fashion. By comparison, the containers themselves are typically large and heavy, and thus difficult to handle. Thus, during operation, drain canal units can simply be replaced as needed, and subsequently taken away for deep cleaning and/or disinfection. Thereby, a user-friendly and efficient depuration system is provided.

There can be an opening on the drain canal unit, a drain canal entry opening, that faces the corner of a container when the drain canal unit is engaged with the container. The drain canal entry opening can be provided near the upper end of its elongated body. Thereby, there will be provided a circulation route for water within the container. Thus, water can flow from the body of the container under the drain canal unit, between the drain canal unit and the container floor, and into the corner portion of the container. Water will then flow, forced by water pressure within the container, through and up the circulation channel or channels within the corner portion, framed by the container body and the drain canal unit. To complete the circulation, water will flow into the drain canal unit via an entry opening to enter the drain canal within the cavity of the drain canal unit, and subsequently water is drained from the container through the spout on the drain canal unit.

The drain canal unit can have dimensions that are adjusted so that its height, when engaged with a container, approximately matches that of the container. Preferably, the drain canal unit, when engaged with the container, does not extend beyond the upper rim of the container. Thus, the drain canal body can have a top surface that interconnects with the first surface, the second surface and the side surfaces and wherein the length of the drain canal structure is such that, when engaged with a container, the top surface does not vertically extend beyond the upper rim of the container.

The drain canal body can comprise a solid approximately flat top surface. The top surface of the drain canal body can also be slightly tilted towards either the first or second (side) surface. Alternatively, the top surface can be curved or otherwise be tilted towards both the first and second side surfaces. The top surface is preferably solid, i.e. the surface is not permeable to liquid so as to ensure that the drain canal within the drain canal body is closed, water only being able to enter and exit through the drain canal entry opening and the spout, respectively.

Water will not circulate in the container until the water level in the container has reached the height of the entry opening on the drain canal unit. The entry opening on the drain canal unit can conveniently be provided near the top of the first surface of the drain canal unit.

Thereby, water circulation in the container will not take place until the container is nearly full, providing conditions for adequate depuration within the container, even when filled with mollusk.

The container can comprise slots on at least two of its inner side walls, near a corner of the container, wherein each slot is adapted to receive an peripheral portion of the drain canal unit, so that when engaged, the drain canal unit is interlocked with the slots. Thereby, the drain canal unit is locked in place with the container, to define a circulation route for water within the container.

The slots can be vertical, to receive a drain canal unit of approximately constant width. The drain canal unit will then slide into the slots from above, i.e. the drain canal unit will be vertically provided into the slots. The slots can however also be tilted towards the corner, to accommodate a drain canal unit that is narrower at its bottom end than its top end; in other words, the drain canal unit may we wider at its top end than its bottom end.

The slots can be of uniform depth and width. The slots can suitably however also be narrower and/or less deep at their lower end, to accommodate a drain canal unit that is slightly thinner at its bottom end and/or is accommodated at a slight angle, i.e. not completely perpendicular to the container floor.

The connection between slots on the side walls of the container and the drain canal unit are preferably tight, so as to minimize leakage through the connections. The connection can be approximately water tight when the container is filled with water, i.e. the connection is able to withstand water pressure corresponding to the height of the container, with minimal leakage of water between the side walls of the container and the drain canal unit.

Preferably, the connection between the spout and the container floor is water-tight. Thus, the spout and the opening in the container floor can be structured so that, when inserted into and through the floor of a container to form a watertight seal therebetween. Further, when inserted into the container floor, there is a gap present between the lower end of the drain canal body and the floor of the container. Thereby, water can flow under the drain canal unit and into the corner portion of the container.

Thus, the drain canal unit spout can be structured so that when inserted into the floor of the container, the entry portion of the circulation route is provided by a gap between the drain channel unit and the floor of the container.

The opening on the spout can be arranged so as to face away from the drain canal entry opening. Thereby, when engaged with a container, water that is released from the drain canal unit is released towards the central portion of the body a below container in a stack of containers. Preferably, the opening is arranged at the lower end of the spout.

The circulation route can thus have an entry opening that is fluidly connected to the corner channel portion, such that water can flow upwardly and through the corner channel, into the drain canal of the drain canal unit, and drained downwardly through the drain canal to exit through the spout on the drain canal unit.

The container can further comprise at least one protrusion along each side wall, wherein the protrusions are arranged to provide support for horizontal positioning of a removable drain plate within the container.

Additional, or alternative, support for a drain plate can be provided in the container, for example by means of supports such as support knobs provided on the container floor. There can thus be provided a plurality of support protrusions or support knobs extending from the floor of the container, and which provide additional support for a drain plate. Such support members, when present, are suitably provided so that they reach the same height as support protrusions on the side walls.

The drain canal unit can also be provided with support means for a drain plate. Thus, the drain canal unit can be further adapted to provide, when engaged with the container, support for a removable drain plate within the container. The support can comprise a ledge or shelf on the drain canal body, so that when inserted into the container floor, there is provided a support for a drain plate that is placed in the container. The support is suitably provided at the same height as other support structures in the container assembly, so that the weight of the drain plate (which includes the weight of mollusks when loaded) is distributed among the support structures.

Accordingly, when both the container and the drain canal unit are provided with support means for a drain plate, the support means preferably are at the same height, so that the drain plate can be accommodated in a horizontal position in the container, with simultaneous support being provided by structures from the container protrusions and support ledge on the drain canal unit.

The container in the container system can be stackable, such that one container can be placed on top of a second container, and so on. Support members (legs) extending downwardly from the bottom or floor of the container can be adapted to fit, when placed on top of another container, onto the upper rim of the container so that a snug and stable connection between the container is made. Such a connection can include having at least a portion of the upper rim configured so that it can receive legs or support members of a container so that the support members fit within an outer portion of the rim and sit on top of an inner portion or ledge of the rim, which can be provided as being lower (i.e., closer to the container floor) than an outer portion of the rim. In other words, the rim can at least partially container a ledge or shelf, such that container support members of a container can sit on the ledge or shelf, when placed on top of a container, so that a snug and stable stack of containers is formed.

There can be one or a plurality of drain canal units arranged in a container. There can for example be two drain canal units arranged in each container and that are arranged to be engaged with the container in proximity to opposite corners thereof, thereby forming two circulation routes in the container.

There can also be three or four drain canal units arranged in respective three or four corners in a container.

When engaged, the spout of a drain canal unit extends through the floor of a container, resulting in draining of water into an adjacent container in a stack. The spout can have an opening at its bottom end that, when engaged with the container, faces away from the corner of the container that the drain canal unit is provided in, so that circulated water is released from the spout and towards the middle interior portion of a below placed container in a stack of containers.

The opening on the spout can be of any suitable shape. The opening can for example be round, oval-shaped or rectangular.

Obviously, other means of stacking containers are possible and are known in the art. The container assembly of the invention is not limited to any particular stacking configuration and can comprise other suitable or alternative means of stacking capabilities.

The containers of the invention can therefore be stacked with other types of containers that are designed to fit within the outer portion of the upper rim of the container. For example, the containers can be stacked with previous containers by the present applicants, e.g. Sæplast 705 containers.

As a consequence of being able to stack a plurality of container assemblies, water that is circulated through the circulation route within a container assembly is drained into a lower container within a stack of containers. Thereby, there is a circulation of water, not only within a single container, but within an entire stack of containers, thus minimizing water use and facilitating efficient depuration in the stack.

The container assembly can be manufactured using conventional molding techniques and/or other methods known in the art. The container assembly can be molded from a thermoplastic polymer material, such as polypropylene or polyethylene. The container can for example by molded from LLDPE, LDPE, HDPE, polyamide (Nylon), polystyrene, polyurethane, polyvinylchloride, acetal, polyphenylene sulfide, polyesters, and the like. Other polymer materials can also be used, such as acrylonitrile butadiene-styrene (ABS) and other copolymers (acetal copolymers). It is also possible that the container be provided in a mixture of materials, or that different portions of the container be provided in different material. Preferably, however, the container shell is molded as a single structure from a homogeneous material.

It can be preferable to provide additional insulation in the containers. For example, the containers can be double walled, with an optional filling provided in the gap between the two walls. For example, the containers can be double walled, using any of the thermoplastic materials described in the above, with an insulating material such as polyurethane or other suitable insulation material provided in between the two walls.

The drain canal unit can be comprised of the same material as the container. This is however not a necessity of the invention. Thus, the drain canal unit can be provided in a different material than the container. Preferably, the drain canal unit is provided in a thermoplastic polymer material, or mixture of materials, such as polypropylene or polyethylene. The drain canal unit can by molded from LLDPE, LDPE, HDPE, polyamide (Nylon), polystyrene, polyurethane, polyvinylchloride, acetal, polyphenylene sulfide, polyesters, and the like. Other polymer materials can also be used, such as acrylonitrile butadiene-styrene (ABS) and other copolymers (acetal copolymers).

The containers in accordance with the invention can be provided with additional features that are well known in the art, such as drain holes for draining the container, and that during normal operation are kept closed by a plug provided therein. Such drain holes can be provided in the container floor, on the side walls of the container, preferably close to the container floor, or both.

The containers can also comprise fork lift insertion openings, so that the containers can be lifted and transported by fork lifts or the like. Such fork lift insertion openings can be provided as suitable, for example within a support member structure of the container.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

FIG. 7 shows how the container assembly of the invention can be used in combination with the prior art containers of the applicants, so called 705 containers.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
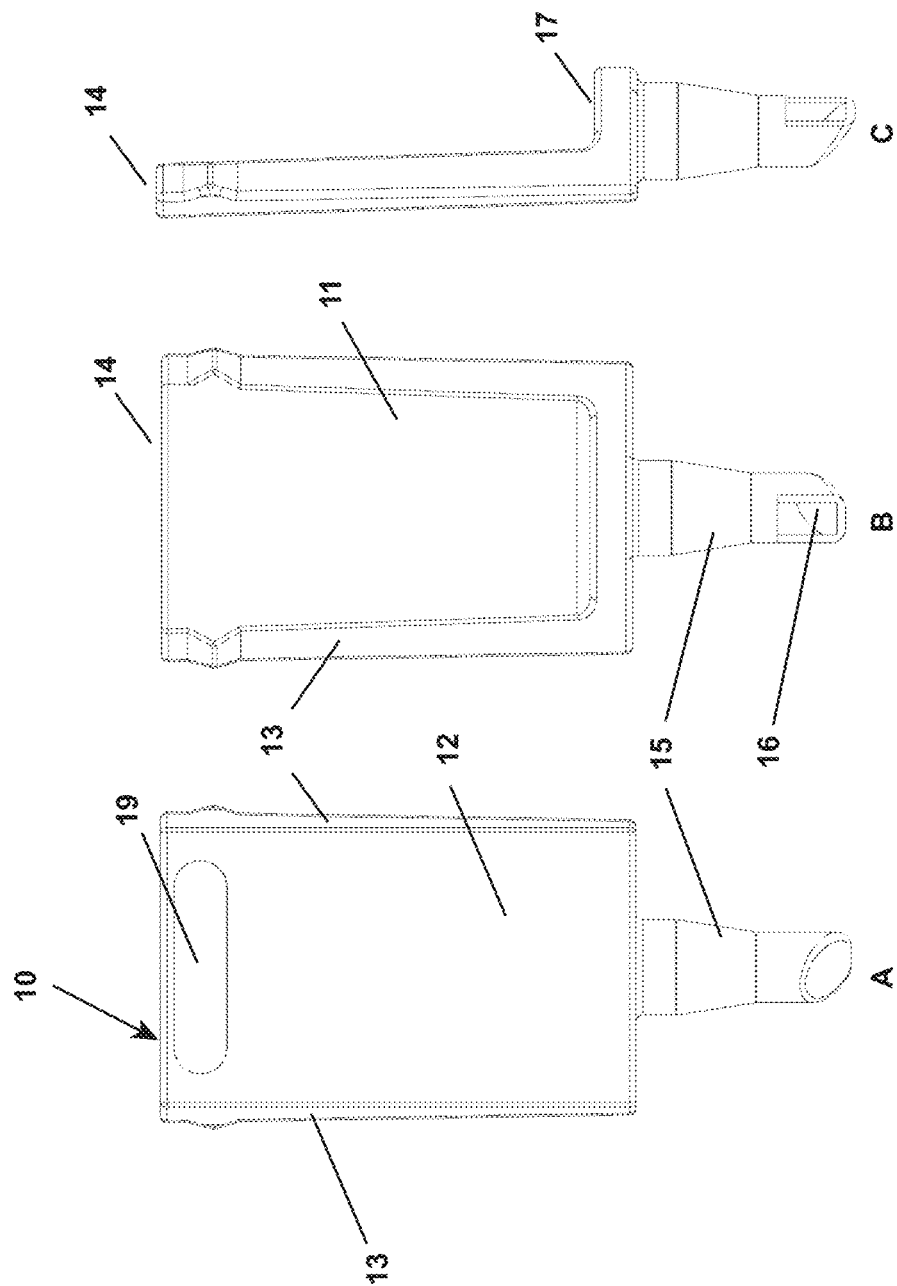
FIG. 1 shows a drain canal unit in accordance with the invention. Shown are back view (A), front view (B), and side view (C) of the unit.

Turning to FIG. 1, there is shown a back view (A), front view (B), and side view (C) of a drain canal unit 10 in accordance with the invention. The drain canal unit has an elongated body 18, which has a spout 15 extending from its bottom. At the lower end of the spout, there is an opening 16 that is arranged so that water that is released through the spout is released away and downwardly from the spout. Further, when engaged with a container, water is released through the opening 16 and towards the middle portion of a below container in a stack of containers.

The body 18 has a two surfaces 11, 12 that, when engaged with a container, face away from and towards a corner of the container, respectively. On the surface 12 that faces a corner, there is an opening 19 that corresponds to the entry point into the drain canal within the drain canal unit. Side surfaces 13 and top surface 14 connect the surfaces 11, 12. The side surfaces 13 are adapted to fit within slots on adjacent side walls of a receiving container so that the drain canal unit can be connected to the container in an interlocked fashion.

The drain canal unit further has a seat or ledge portion 17 that is intended to provide support for a drain plate in the container, so that when the drain canal unit is engaged with a container, a drain plate that is introduced in the container is partially supported by the seat portion 17.

Figure 2A:
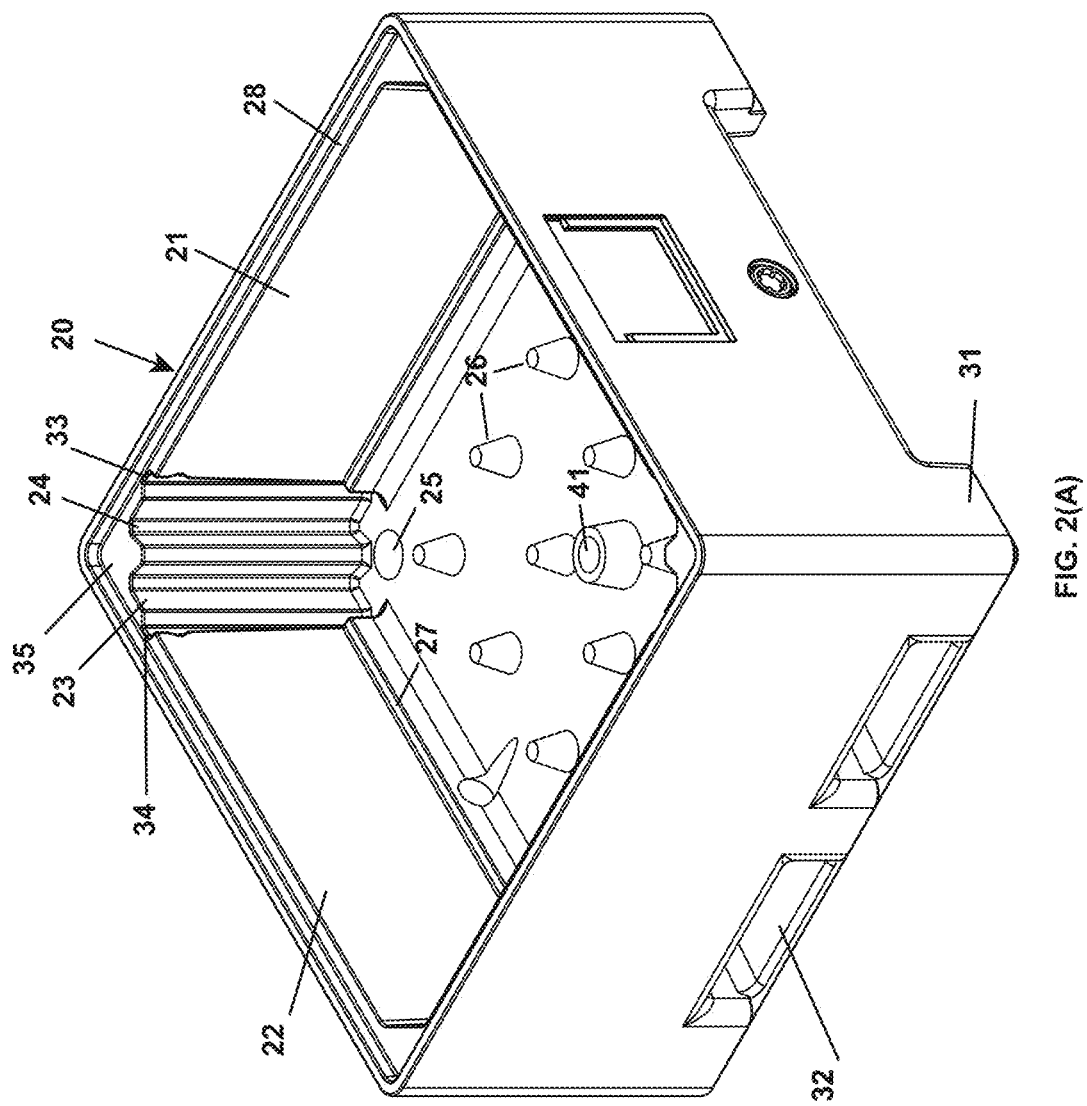
FIG. 2 shows a container assembly in accordance with the invention. Shown in (A) a container that is adapted to receive a drain canal unit; and in (B) a drain canal unit and a drain plate have been provided to complete the assembly.
Figure 2B:
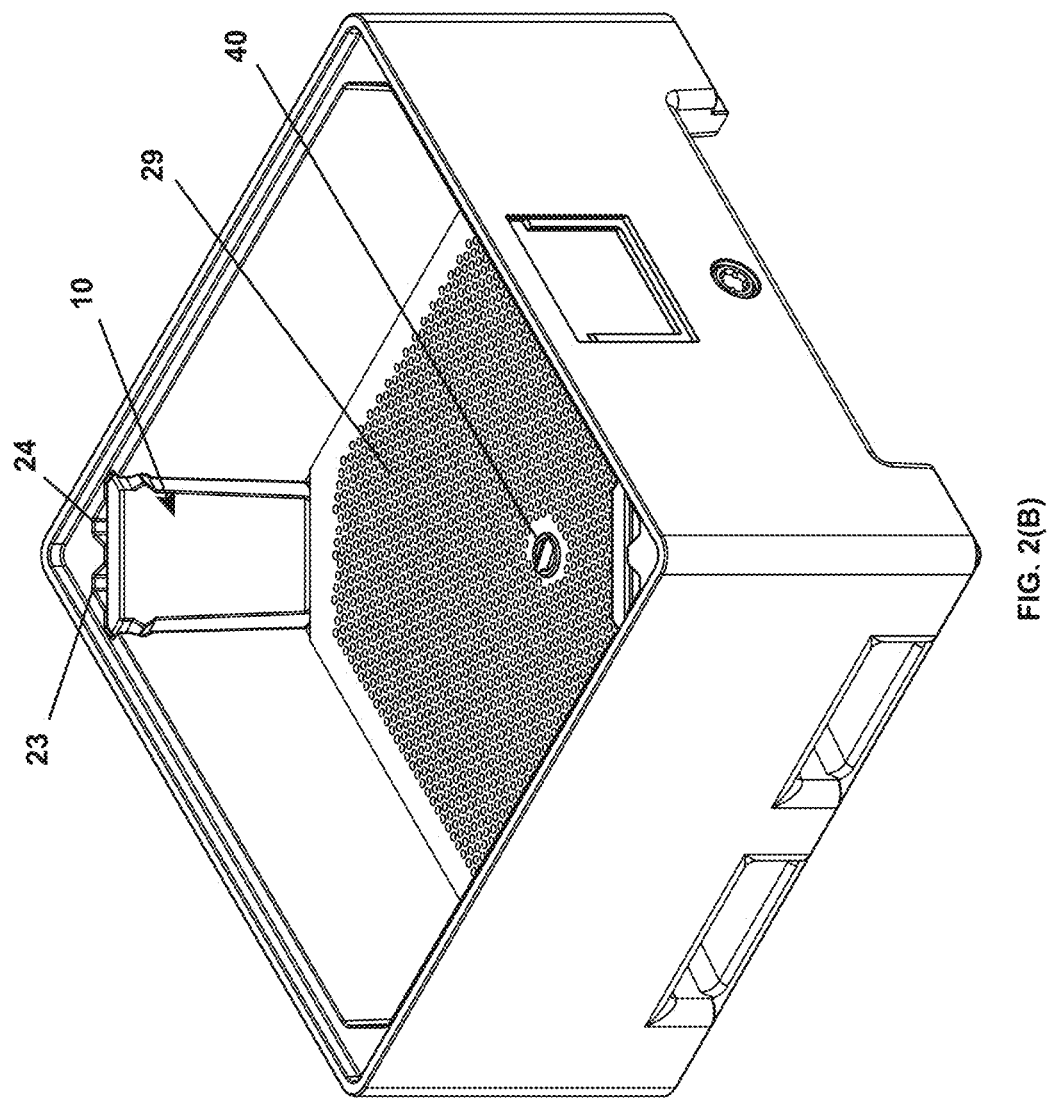

In FIG. 2, a container 20 that can be used in a container assembly in accordance with the invention is shown in (A). The container has upright side walls 21, 22 that meet at a corner 35. In the corner section of the container, two slots 23, 24 are shown, parallel and equidistant from the corner 35. On the side walls 21, 22 there are also slots 33, 34 that are adapted to receive a drain canal unit in a container assembly.

The side walls 21, 22 also contain support ledge 27 for providing support for a drain plate that can be accommodated in the container. Further, supports or support knobs 26 are arranged on the floor of the container, and which provide additional support for a drain plate. It follows that the supports 26 are configured to be equidistant from the floor and reach the same height as support protrusions 27.

A drain hole 25 is also shown in the floor of the container. This hole is adapted to receive a spout of the drain canal unit, so that recirculated water can be drained from the container via the spout. The connection between the spout and the drain hole is preferably water-tight, so that there is no leak from the container body, and further to also provide structural support to the drain canal unit—container assembly.

The upper rim of the container has a shelf or ledge 28 type structure. This structure serves the purpose of allowing containers to be stacked, so that that a snug and stable connection is made between the containers. Thus, the container comprises support members 31 that are, at their lower end, structured so that the support members can sit on the ledge 28 on a below container, fitting within the outer portion of the upper rim, forming a snug and stable connection between the support members and the rim, thereby forming a stable stack with respect to horizontal movement. Thus, the support member structure 31 is provided so that the support members can sit on top of the ledge 28 provided on the upper rim. Thus, the outer dimensions of the support members at their lower end are adjusted so that they match the dimensions of the container at its upper edge, i.e. between outer edges of shelf or ledge 28, so that the support members of one container can fit snugly within the rim of a below container.

The container further is further structured so that that forks of a fork lift can be inserted into the support members structure 31 through slits 32. Thereby, the container can be transported and/or stacked by means of a fork lift or the like.

In (B), a container assembly is shown, in which a drain canal unit 10 and drain plate 29 are provided. The drain canal unit 10 can be engaged with the container, by sliding the unit into slots 33, 34 and subsequently the spout 15 into the drain hole 25 on the container. Thereby, the drain canal unit is interlocked with the container, via the connection between side surfaces 13 on the unit and the connection between the spout and the drain hole on the container. Further, when engaged with the container, the drain canal unit provides additional support for a drain plate within the container, via its support ledge 17. Circulation channels are provided by the slots 23, 24 that are closed off from the main body of the container by the drain canal unit 10.

The drain plate 29 is supported by ledges 27 and support members 26 on the container, with further support provided by the support ledge 17 on the drain canal unit. Further, the drain plate is secured to the container by means of a nut 40 that fits into a receiving hole 41. Preferably, the nut and hole can be threaded so as to facilitate the secure fastening of the drain plate.

Figure 3:
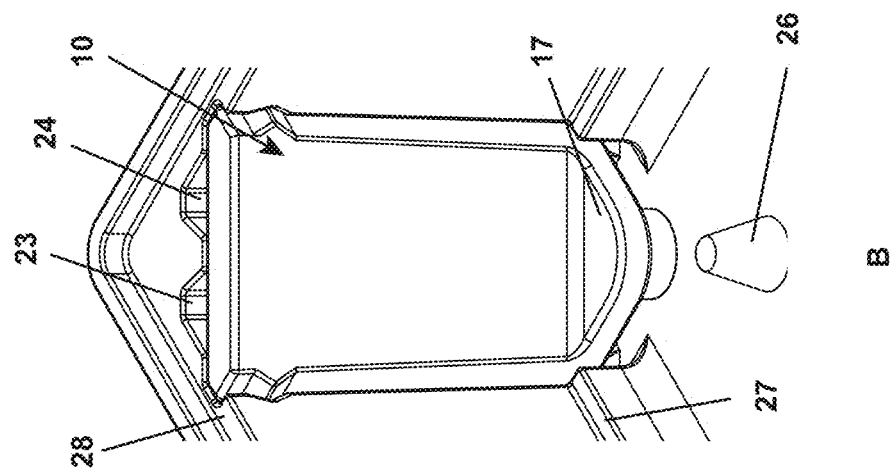
FIG. 3 shows a close-up perspective view of a corner of the container assembly, where in (A) the corner of the container is shown with the drain canal unit absent, and in (B) the drain canal unit is shown engaged with the container.
Figure 3:
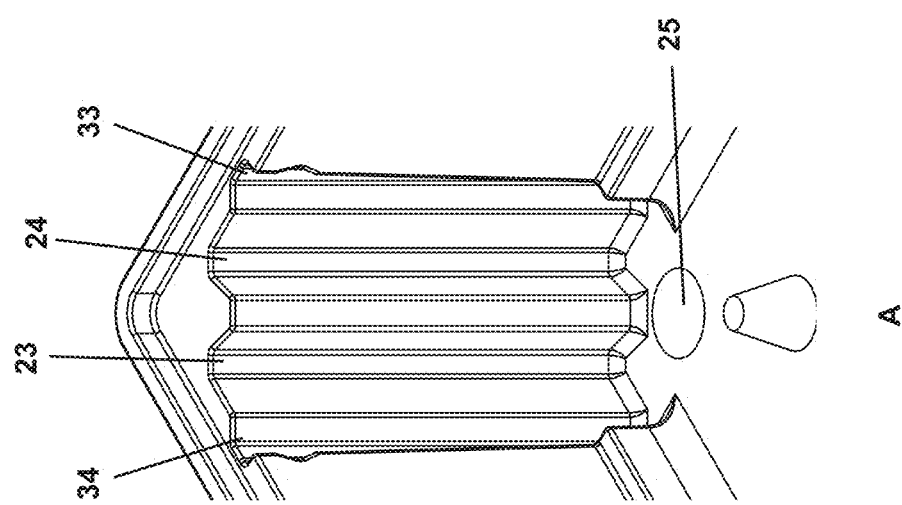

FIG. 3 provides in (A) a close-up view of a corner section of a container in the absence of a drain canal unit, while in (B) the same section with the drain canal unit in place is shown. It can be seen how the drain canal unit is interlocked with the container walls via the connection between the side surfaces 13 of the unit and slots 33, 34, and further by the connection between the spout 15 and the drain hole 25 in the floor of the container. Circulation channels are formed by slots 23, 24 that are blocked from the body of the container, and by the drain canal unit 10 that provides the barrier between the slots and the body of the container. When water levels rise in the container, water can enter the drain canals via a forced flow under the drain canal unit, between the drain canal unit and the floor of the container, to enter circulation channels 23, 24 that are formed between the drain canal unit and the corner of the container. As water levels in the container rise, so will the water level in the circulation channels, until the water level reaches the opening 19 on the drain canal unit that faces the corner (not seen in this view). Water will subsequently flow into and through the drain canal unit and can subsequently be drained from the container via the exit opening 16 on the spout 15. Thereby, there will be a circulation of water in the container that is driven by the water levels in the container, i.e. there will be no circulation until the water level in the container has reached that of the opening 19, at which point there will be a forced circulation of water in the container.

Figure 4:
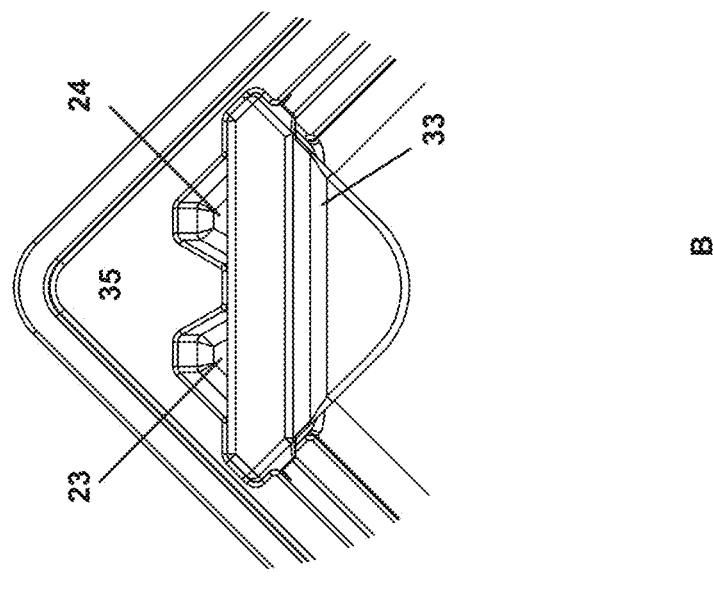
FIG. 4 shows a top view of the corner of the container assembly, where in (A) the corner of the container is shown with the drain canal unit absent, and in (B) a top view of the drain canal unit is shown engaged with the container.
Figure 4:
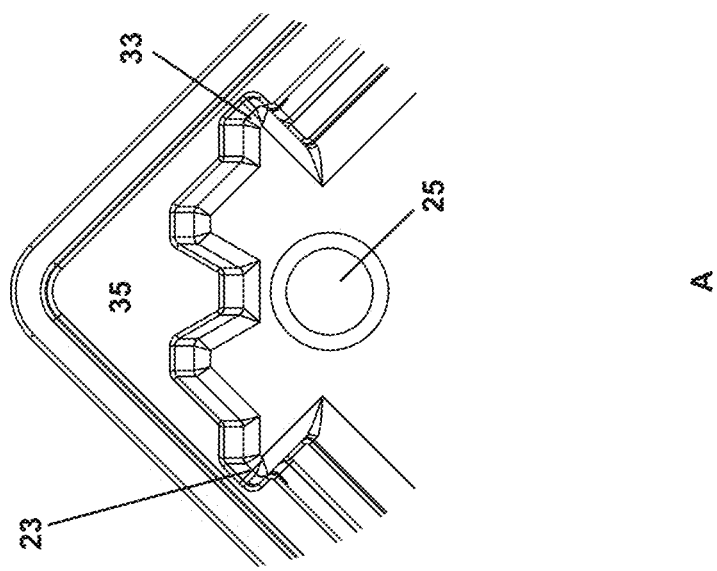

In FIGS. 4, (A) and (B), a top view of the corner section is shown, showing how the drain canal unit can slide into slots 33, 34 and into the drain hole 25 in the container floor, so as to generate circulation channels behind the drain canal unit, between its inner surface 12 (facing the corner when engaged with container) and the corner 35 of the container. It will be appreciated that while the embodiment shown has two circulation channels 23, 24, the corner section of the container can be adapted to provide additional (e.g., three or more) or fewer circulation channels (i.e. a single channel). The ghist of this functionality is to provide a closed circulation system, where water is forced under the drain canal unit, into one or more circulation channel in the corner of the container, and into the hollow drain canal unit, from which water is drained (e.g., into adjacent container in a stack of containers).

The container assembly is adapted to be particularly useful for the depuration of mollusks. The system allows for forced circulation of water within such containers. In particular, the system is adapted to provide uniform circulation and thereby depuration within stacked containers, by allowing water to circulate within each container and be delivered into a below container in a stack.

Figure 5:
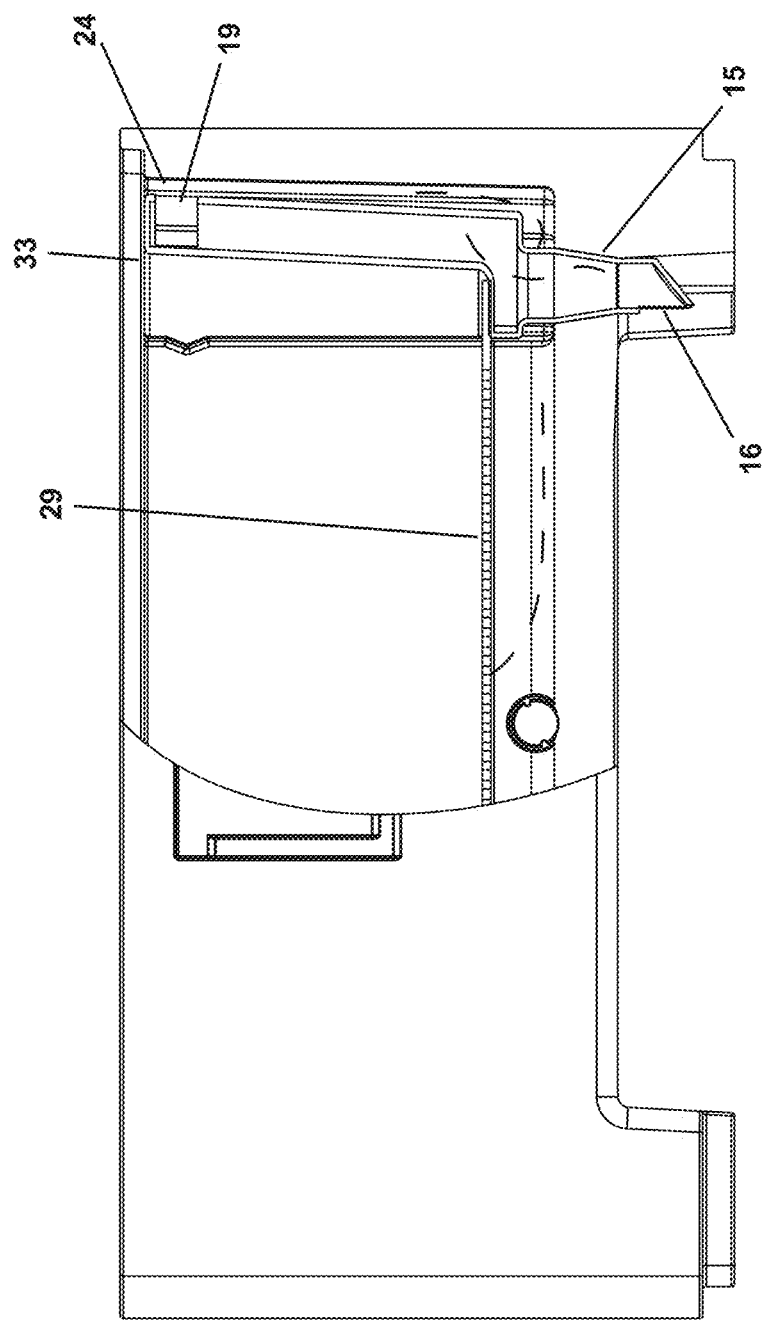
FIG. 5 shows a cut-through view of a container assembly, where the arrows indicate the circulation route within the assembly.

The circulation in each container is illustrated in FIG. 5, which shows a cut-through view of a container assembly as described in the above. Mollusks are placed within the container, on top of a drain plate 29. Water and fine dirt (sand, grit and the like) is able to pass through holes on the drain plate. Dirt settles on the bottom of the container. Water however, is forced by the water pressure in the container towards corners of the container that contain a drain channel unit, as indicated by dashed arrows. Water is forced to flow through an entry portion of the circulation route under the drain channel unit, into circulation channels in the corner of the container that are formed by the slots 23, 24 and the drain channel unit 10. The water path up through the circulation channels leads into the opening 19 of the drain channel unit, from where water flows through the drain canal within the body of the unit and exits via an opening 16 on the spout 15, that sits embedded in the floor of the container.

Thereby, there is provided forced circulation of water through the drain plate, towards the corners of the container and through the circulation route provided by the drain channel unit and circulation channels in the corner portion of the container. The circulation is completed by drainage through the drain canal unit and exit through the spout extending from the drain canal unit.

Figure 6A:
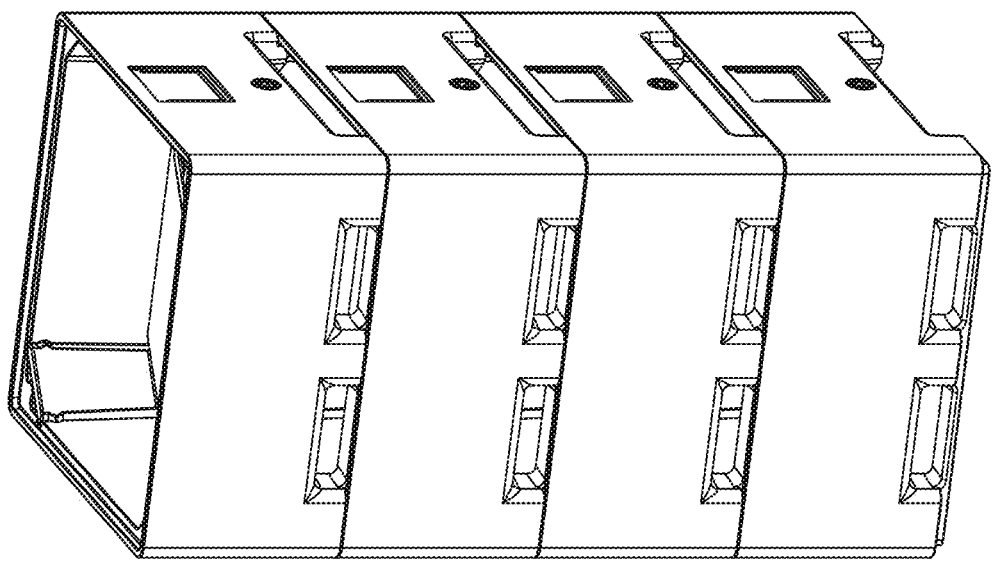
FIG. 6 shows in (A) a stack of container assemblies, showing how the containers can be stacked in an interlocked fashion. In (B), a cut-through view of the assembly is shown, so that it can be seen how water is released through the spout of a container assembly into an adjacent container in the stack.

In FIG. 6(A), a stack of container assemblies in accordance with the invention is shown. The containers are stackable, so that the support members 31 of one sit on ledges 28 on the upper side walls, inwardly from the upper rim of the outer side wall of a below container in a stack. Thereby, the stack is provided with structural stability.

Figure 6B:
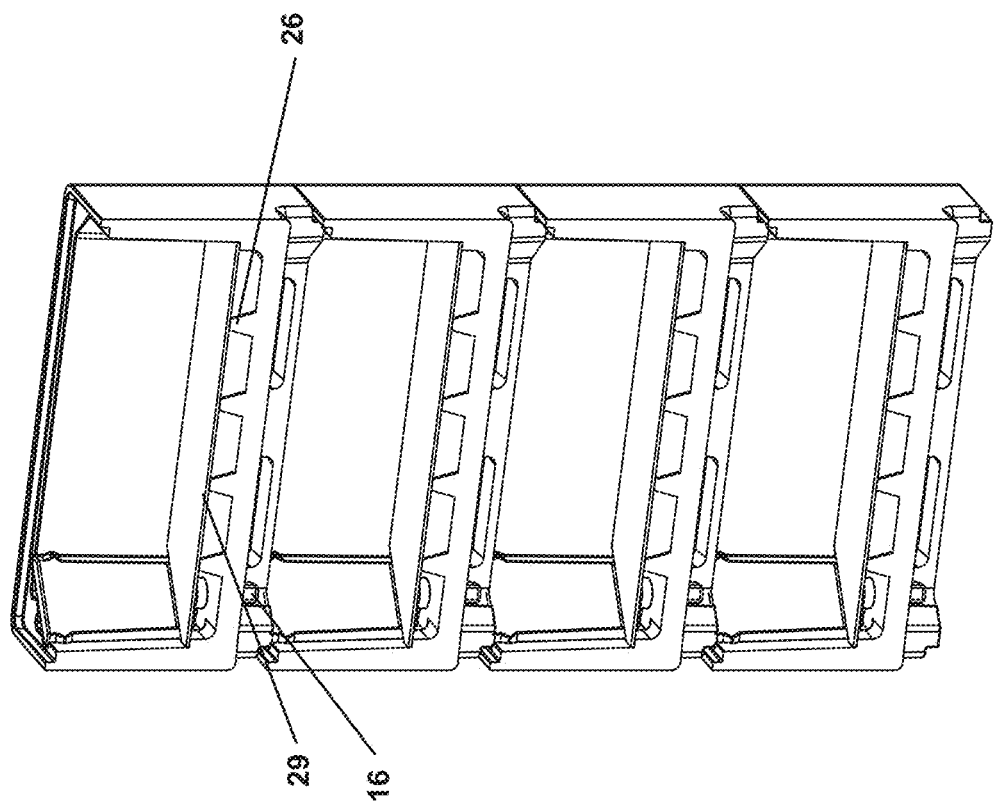

In FIG. 6(B) there is shown a cross-sectional view of the stack of container assemblies, highlighting the relative position of the containers in the stack and the relative position of the spouts in the stack. It can be seen that the opening 16 on the spout 15 that extends from the bottom of a drain canal unit 10 of an assembly is pointed towards the middle of the interior cavity of a below container in a stack of containers. Thereby, water is circulated in the stack so that excess water in a top container is released from its spout and towards the middle of a below container in the stack, and so on. Thereby, there is a continuous circulation of water in the stack, with water that is released from the bottom container in the stack being delivered into a drain or the like. It is also apparent in this view how the drain plate 29 sits on support members 26 that extend from the floor of each container.

An advantage of the container assembly as described herein is that it can be used in combination with certain prior art containers. Containers that can fit within the upper rim and sit on ledges 28 on the upper side walls of the container can in particular be used in combination with the container assembly. For example, the container assembly in accordance with the invention can be used in combination with a prior art container by the present applicants, called Sæplast 705 container. This prior art container is a stackable depuration container from which depuration water that has been circulated in the container is drained into a below container in a stack.

As shown in FIG. 7, the prior art 705 container 50 and the container assembly 20 in accordance with the invention can be used in combination. Thus, shown in the figures is an assembly showing an alternate stack of containers, with a container assembly according to the invention and a 705 container in between two container assemblies. The stack can obviously be extended to include prior art containers 50 and container assemblies 20 in accordance with the invention in any desired order and number.

It should be apparent from the foregoing, that some of the advantages of the present invention include:
    providing a two-part container system, that is easy to produce and assemble cleaning of container is easy, due to lack of closed channels that may become clogged or contaminated drain canal units can be replaced as needed at minimal cost production and maintenance costs of the containers, due to simplified design, is lower than for conventional depuration containers As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A container assembly comprising:
   a. at least one drain canal unit adapted to be operatively and removably engaged in an interlocked fashion with a container near a corner thereof, the drain canal unit comprising at least one drain canal that has at least one entry opening near its top and at least one spout at its lower end, for removable insertion into and through the floor of the container so that the at least one entry opening, when the drain canal unit is interlocked with the container, faces the corner of the container;
   b. the said container having four upright side walls and having slots on at least two adjoining inner side walls of the four upright sidewalls, wherein the adjoining inner sidewalls form the corner of the container, the drain canal unit comprising peripheral portions adapted to removably fit into and removably interlock with said slots to form a substantially water-tight seal when engaged with said slots so that the drain canal unit is engaged in an interlocked fashion with said two adjoining side walls of the container in proximity to said corner so that the engaged drain canal unit is positioned near the corner of the container and wherein the container is further adapted to removably receive the drain canal unit spout into and through an opening in the container floor so that a substantially water-tight seal is formed therebetween;
   so that when the drain canal unit is engaged with the container, at least one circulation channel between the drain canal unit and the corner of the container is formed;
   whereby the engaged at least one drain canal unit and the container form at least one circulation route, wherein each circulation route has an entry portion positioned between the drain canal unit and the floor of the container, the at least one circulation channel positioned between the drain canal unit and the container corner, and the at least one drain canal positioned within the drain canal unit;
   so that water within the body of the container can circulate through the entry portion into the at least one circulation channel and be drained through the drain canal unit to exit the container assembly via its spout.

2. The assembly of claim 1, comprising a plurality of stackable container assemblies, and wherein water that is circulated through the circulation route is drained into a lower container within a stack of containers.

3. The assembly of claim 1, comprising for each container two drain canal units that are positioned in the container in two opposite corners thereof, thereby forming two circulation routes in the container.

4. The assembly of claim 1, wherein the spout has an opening at its bottom end that, when engaged with the container, faces away from the corner of the container with which the drain canal unit is engaged, so that circulated water is released from the spout and towards the middle portion of a below placed container in a stack of containers.

5. The assembly of claim 1, wherein the drain canal unit comprises a hollow structure that has an opening near its top, so that when engaged with the container, the opening faces a corner of the container.

6. The assembly of claim 1, wherein the drain canal unit comprises a hollow structure that is adapted to fit into said slots in said two adjoining side walls of the container, to form said substantially water-tight seal when engaged with the slots.

7. The assembly of claim 1, wherein each of said slots is adapted to receive a peripheral portion of the drain canal unit, so that when engaged, the drain canal unit is interlocked with the slots.

8. The assembly of claim 1, wherein the circulation route comprises an entry opening that is fluidly connected to the at least one circulation channel, such that water can flow upwardly and through the at least one circulation channel, into the drain canal, and drained downwardly through the drain canal to exit through the spout on the drain canal unit.

9. The assembly of claim 1, wherein the container further comprises at least one protrusion along each side wall, wherein the protrusions are arranged to provide support for horizontal positioning of a removable drain plate within the container.

10. The assembly of claim 9, wherein the drain canal unit is further adapted to provide, when engaged with the container, support for the removable drain plate within the container.

11. The assembly of claim 9, wherein the drain canal unit spout is structured so that when inserted into the floor of the container, the entry portion of the circulation route is provided by a gap between the drain channel unit and the floor of the container.

12. A drain canal unit, for use in stackable containers to allow circulation of water within an individual container in a stack of containers and drainage into adjacent containers in the stack, the drain canal unit comprising:

an elongated body that has at least one spout extending from its lower end and that is adapted to removably fit into and through an opening in the individual container floor to provide a water-proof seal therebetween;

the elongated body comprising a first surface and an opposing second surface wherein, when the drain canal unit is removably engaged with the individual container that the drain canal unit is adapted to fit into, the first surface faces a central portion of a body of the individual container, and the opposing second surface container, and wherein the first and second surfaces are interconnected by side surfaces that comprise peripheral portions adapted to removably fit into slots on respective adjoining side walls of the individual container to provide a removable interlocked connection therebetween, wherein the adjoining sidewalls form the corner of the individual container and wherein, when the peripheral portions are removably fit into the slots on the adjoining sidewalls, at least one circulation channel between the drain canal unit and the corner of the individual container is formed;

wherein the elongated body is at least partially hollow to provide a drain canal that is fluidly connected to the spout and that has at least one entry opening on the second surface of the drain canal body near the top of the drain canal unit.

13. The drain canal unit of claim 12, wherein the drain canal entry opening faces a corner of the container, when the drain canal unit is engaged with the container.

14. The drain canal unit of claim 12, wherein the drain canal entry opening is provided near the upper end of its elongated body.

15. The drain canal unit of claim 14, wherein the drain canal body has a top surface that interconnects with the first surface, the second surface and the side surfaces and wherein the length of the drain canal structure is such that, when engaged with a container, the top surface does not vertically extend beyond the upper rim of the container.

16. The drain canal unit of claim 15, wherein the drain canal body comprises a solid top surface, and wherein the entry opening is provided near the top of the first surface of the drain canal unit.

17. The drain canal unit of claim 12, wherein the spout is structured so that, when inserted into and through the floor of a container to form a watertight seal therebetween, a gap is present between the lower end of the drain canal body and the floor of the container.

18. The drain canal unit of claim 12, wherein the spout has an opening on the lower end thereof and that faces away from the drain canal entry opening.

* * * * *

UNITED STATES PATENT AND TRADEMARK OFFICE
CERTIFICATE OF CORRECTION

PATENT NO. : 11,528,894 B2
APPLICATION NO. : 16/617800
DATED : December 20, 2022
INVENTOR(S) : Dagur Oskarsson It is certified that error appears in the above-identified patent and that said Letters Patent is hereby corrected as shown below:

In the Claims

Column 13, Line 23: Claim 12 Delete "second surface container, and" and insert -- second surface faces a corner of the individual container, and --

Signed and Sealed this
Fourteenth Day of February, 2023

Katherine Kelly Vidal
*Director of the United States Patent and Trademark Office*